(12) United States Patent
Dressler

(10) Patent No.: US 8,915,987 B2
(45) Date of Patent: Dec. 23, 2014

(54) CARBON DIOXIDE ABSORPTION SYSTEM

(71) Applicant: Lawrence V. Dressler, Cranston, RI (US)

(72) Inventor: Lawrence V. Dressler, Cranston, RI (US)

( * ) Notice: Subject to any disclaimer, the term of this patent is extended or adjusted under 35 U.S.C. 154(b) by 0 days.

(21) Appl. No.: 13/694,362

(22) Filed: Nov. 26, 2012

(65) Prior Publication Data

US 2013/0205998 A1    Aug. 15, 2013

Related U.S. Application Data

(60) Provisional application No. 61/564,718, filed on Nov. 29, 2011.

(51) Int. Cl.
*B01D 53/14* (2006.01)
*B01D 53/62* (2006.01)
*B01D 53/18* (2006.01)

(52) U.S. Cl.
CPC ........ *B01D 53/1412* (2013.01); *B01D 53/1475* (2013.01); *B01D 53/62* (2013.01); *Y02C 10/06* (2013.01); *B01D 53/18* (2013.01); *B01D 2258/0283* (2013.01); *Y02C 10/04* (2013.01)
USPC ............................ 95/11; 95/1; 95/139; 96/234

(58) Field of Classification Search
USPC ...................... 95/1, 11, 139; 96/234
See application file for complete search history.

(56) References Cited

U.S. PATENT DOCUMENTS

| | | | |
|---|---|---|---|
| 6,364,938 B1 * | 4/2002 | Birbara et al. | 95/139 |
| 7,776,138 B2 * | 8/2010 | Schmidt et al. | 95/136 |
| 8,197,857 B2 | 6/2012 | Dressler et al. | |
| 8,500,851 B2 * | 8/2013 | Brown et al. | 95/108 |
| 2005/0084738 A1 * | 4/2005 | Ohlsen et al. | 429/39 |
| 2009/0193969 A1 * | 8/2009 | Schmidt et al. | 95/148 |
| 2009/0260518 A1 * | 10/2009 | Wright et al. | 95/11 |
| 2009/0305388 A1 * | 12/2009 | Dressler et al. | 435/257.1 |
| 2012/0048111 A1 * | 3/2012 | Nakao et al. | 95/139 |

* cited by examiner

*Primary Examiner* — Christopher P Jones
(74) *Attorney, Agent, or Firm* — Michael de Angeli

(57) ABSTRACT

Carbon dioxide is removed from a source gas stream by admission to a vessel containing a quantity of a material preferentially absorbing carbon dioxide. The carbon dioxide content of an escaping gas stream is monitored. When the carbon dioxide content of the escaping gas stream indicates that absorbent is saturated with carbon dioxide, an inlet valve is closed, and a vacuum applied, causing the carbon dioxide to be desorbed for collection.

4 Claims, 2 Drawing Sheets

CARBON DIOXIDE ABSORPTION SYSTEM

CROSS-REFERENCE TO RELATED APPLICATION

This application claims priority from provisional application Ser. No. 61/564,718, filed Nov. 29, 2011.

FIELD OF THE INVENTION

The present invention generally relates to a system, apparatus, and method for capturing and releasing carbon dioxide from, for example, a flue gas stream, by absorption of the carbon dioxide in an absorbent, followed by capture and desorption. The present invention relates generally to methods and systems for capturing, sequestering, storing, or disposing of carbon dioxide to mitigate, reduce, or eliminate carbon dioxide emissions.

The carbon dioxide thus captured can be used in a multitude of industries including, without limitation, the food, oil, chemical, and commercial gas industries.

BACKGROUND OF THE INVENTION

A serious environmental problem facing the world today is global climate change, i.e., global warming, which has been linked to the increased production of greenhouse gases, namely, carbon dioxide. Growing evidence details the accumulation of greenhouse gases in the air, the most important of which is carbon dioxide, as having an associated role in causing global climate warming. Since 2001, carbon dioxide has accounted for over 82% of all greenhouse gas emissions in the United States. Nearly 60% of carbon dioxide is emitted by utility or industrial power generation plants, which rely on fossil fuel combustion. The continuing increase in the greenhouse gas carbon dioxide in the atmosphere highlights the need to develop cost-effective, reliable and safe methods of carbon dioxide capture from flue gases, among other sources.

More specifically, in order for carbon-rich fossil fuels, such as coal and natural gas, to remain viable and environmentally acceptable energy sources throughout the 21st century and beyond, new technologies that allow capture and sequestration, utilization, or recycling of carbon dioxide need to be developed at reasonable costs. The sequestration of carbon dioxide would allow the use of carbon-based fuels to meet the world's increased energy demands far into the future, without further increasing the atmospheric concentration of carbon dioxide. Additionally, for fossil fuels to maintain their predominance in the global energy market, the disposal of carbon dioxide and the elimination of carbon dioxide emissions to the air are ultimate goals for curbing the problem of global warming.

Environmental pollution stemming from fossil-fueled power plants is of particular concern. Power plants emit greenhouse gases, notably carbon dioxide. Although certain methods and technologies are being developed that reduce carbon dioxide emissions, they are often expensive and require considerable energy. This carbon dioxide can be "captured" or removed from the flue gas using several known methods including air separation/flue gas recycling, amine scrubbing, cryogenic fractionation, and membrane separation, discussed further below.

Purified carbon dioxide is also a market product of significant value, such that a stream of purified carbon dioxide is a valuable product. It would be very useful to remove carbon dioxide from, for example, a flue gas stream so as to produce a supply of purified carbon dioxide while purifying the flue gas stream.

There are three direct techniques that are used primarily to reduce carbon dioxide emission from plants that burn fossil fuels such as coal, natural gas, and oil. These techniques are known as pre-combustion capture, oxy-fuel combustion capture, and post-combustion capture.

Pre-combustion capture involves "integrated gasification combined cycle" (IGCC) technology. This is an upstream process for gasifying coal in combined cycle power plants (gas and steam power plants.) This process first converts coal to a synthesis gas (syngas) inside a gasifier at high temperatures and under pressure. The syngas mainly comprises hydrogen and carbon monoxide. Next a water-gas shift reaction is then used to create carbon dioxide and additional hydrogen. The carbon dioxide is then scrubbed, and the hydrogen is burned to produce power, e.g., in a gas turbine. The advantage of this approach is that it is much less expensive than the post-combustion capture process. The disadvantages are that there are only a few IGCC plants in the existing coal fleet and IGCC plants are more expensive than post-combustion (PC) plants (discussed below) when costs of carbon dioxide capture for the latter are not included.

Another carbon capture technique is known as "oxy-fuel combustion". In this process coal is combusted in an atmosphere consisting of pure oxygen and carbon dioxide. This means that the resultant flue gas is not diluted by nitrogen from the air, but primarily consists of carbon dioxide and water vapor. The water vapor is easily condensable, and leaves behind a highly concentrated carbon dioxide stream. The carbon dioxide can then be compressed and transferred to storage. Disadvantages include the requirement of a source of oxygen.

The third principal carbon capture technique is "post-combustion capture." This technique uses amines to separate the carbon dioxide in conventional coal-fired power plants following desulphurization of the flue gas. This is the only method for retrofitting existing power plants. However there are several concerns regarding this technique such as high capital cost with estimated 75% increase from adding carbon dioxide capture, large footprint required for carbon dioxide capture equipment, numerous operational concerns, and high energy penalty for carbon dioxide stripping and regeneration of solvent.

In a more specific discussion of known post-combustion methods for purification of flue gases, these generally involve several separate treatments to provide carbon dioxide having high purity. These purification treatments including washing, absorption, adsorption, desorption, and the removal of reducing substances. Washing generally involves a water absorption shower (water wash) to remove solids and at the same time to cool the combustion gases. Various scrubbing solutions are generally employed to remove contaminants and to reduce the components in the combustion gas mixture to carbon dioxide.

The washed and scrubbed flue gases are then separated to obtain carbon dioxide rich fraction. In one separation method, the combustion gas mixture is circulated through a countercurrent shower of an absorbing solution. Carbon dioxide can be desorbed by heating the carbon dioxide saturated solution.

The purified and separated carbon dioxide is then compressed to a pressure in the range from about 230 psia to about 400 psia, dried by contacting the gas with a regenerable desiccant, and liquified by lowering the temperature of the gas. Finally, a rectification distillation step eliminates the small amount of nitrogen, oxygen, and argon to provide carbon dioxide having a high purity.

As described above, the prior art in this field continues to suffer from overall efficiency of the process and undesirable costs and expenses. These problems have been significantly mitigated by the system and process of this invention for capturing and releasing carbon dioxide.

SUMMARY OF THE INVENTION

In accordance with the present invention, new and novel systems, apparatus, and methods for capturing and releasing carbon dioxide are provided herein. Where the source gas stream is from a power plant or the like, the method of the invention can also be considered "post-combustion", but it is very different from the method discussed above. The present invention relates generally to methods and systems for capturing, sequestering, storing, and disposing of carbon dioxide to mitigate, reduce, or eliminate carbon dioxide emissions. It is a general aspect of the present invention to provide new methods or processes for extracting, reducing, capturing, disposing of, sequestering, or storing carbon dioxide or removing excess carbon dioxide from the air, as well as new methods and processes for reducing, alleviating, or eliminating the emission of carbon dioxide to the atmosphere.

This invention provides a modular carbon capture system that can be adapted to a wide range of industries that require carbon dioxide remission, from a neighborhood bakery's flue stack to megawatt-sized coal-fired power plants. The captured carbon dioxide can be used in agriculture (for example, as a feedstock in algae farming) or purified, compressed, and sold as commercial gas for pH control applications in water treatment, drying techniques, enhanced oil recovery and chilling applications.

No major US industrial gas suppliers produce their own carbon dioxide. They typically align themselves with chemical (ammonia), fermentation (ethanol, breweries) or petroleum refineries, all of which produce carbon dioxide which must be collected in some manner, and form joint ventures. Carbon capture, purification and freight are the key cost factors.

The technology of the invention allows for on-site production of a pure stream of carbon dioxide from, for example, a flue gas stream, so as to dramatically reduce transportation, handling, and combustion costs. The invention provides a low energy solution that is adaptable to most flue stacks. As for power plants, there are currently very limited options for companies with fossil-fuel combustion plants to capture carbon dioxide. As outlined above, these options require high capital expenditures, involve high energy costs, and require a large footprint for the facility. Companies using carbon sequestration techniques tend to be greater than 500 MW power plants, mainly coal-fired. The invention can provide solutions to large carbon dioxide emitters in modular stages, which can be an additional benefit depending on future federal and state carbon dioxide regulations.

Briefly stated, the method of the invention involves the step of admitting a stream of (for example) flue gas to be treated to a vessel containing an absorbent with an affinity for carbon dioxide on a suitable carrier. The stream to be treated passes through the vessel, while the carbon dioxide therein is absorbed. The constituents of the stream exiting the vessel are monitored for carbon dioxide. When the monitoring step indicates that carbon dioxide is present in the exit stream, the inlet is halted, and the carbon dioxide desorbed and captured, for use elsewhere.

BRIEF DESCRIPTION OF THE DRAWINGS

The invention will be better understood if reference is made to the accompanying drawings, in which.

DESCRIPTION OF THE PREFERRED EMBODIMENTS

Figure 1:
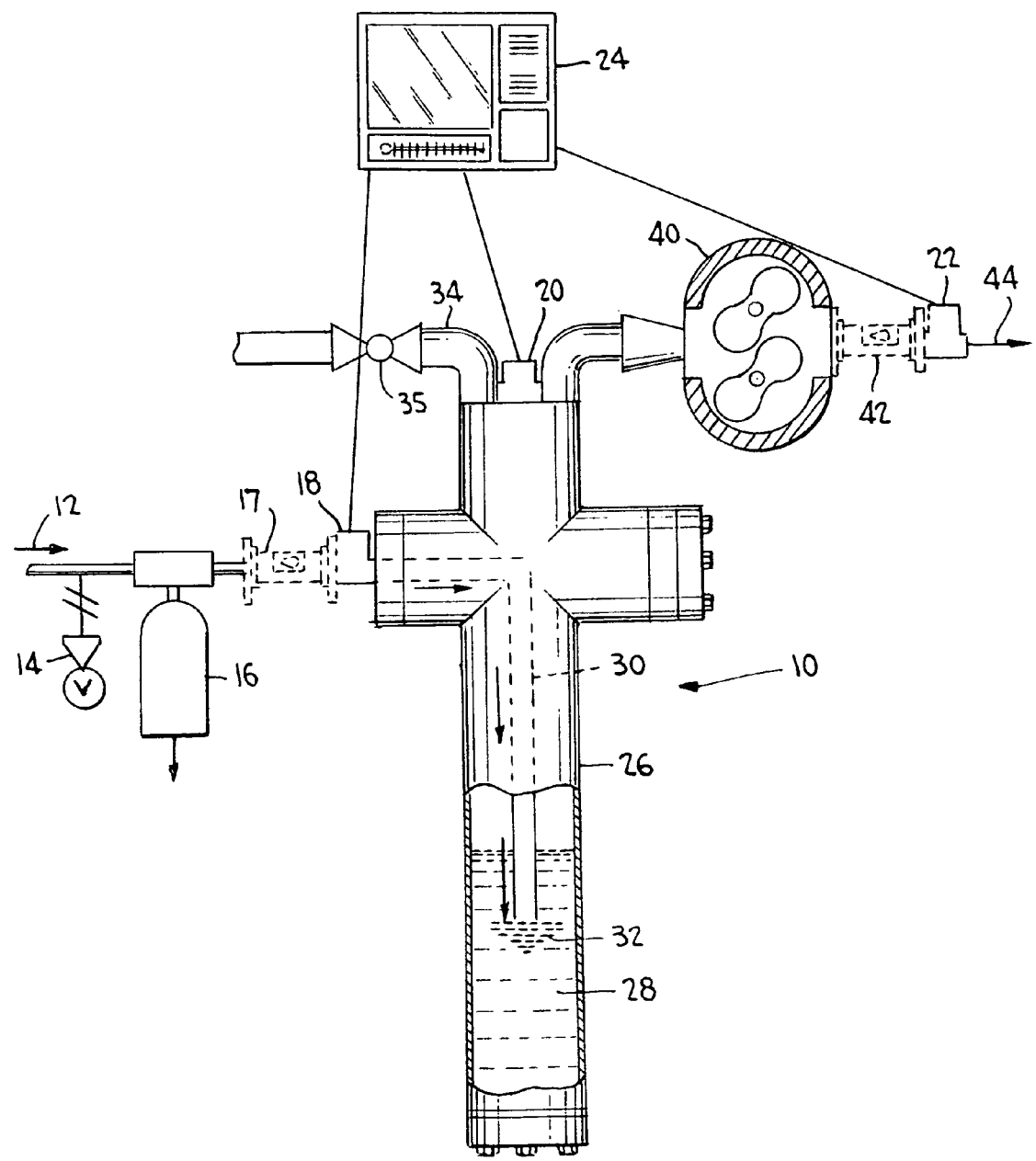
FIG. 1 shows a schematic view of one embodiment of apparatus for practicing the invention.

FIG. 1 shows the principal components of a system 10 for removing carbon dioxide from a flue gas stream or the like, while capturing carbon dioxide for subsequent collection, for use or disposal. It should be noted that the system of the invention is useful in thus removing carbon dioxide from substantially any source, such as a flue stack of a coal plant.

The carbon dioxide capturing system of the invention 10 generally includes an emission gas inlet for a stream of gas to be processed indicated at 12, which can be connected to any source of gas including carbon dioxide. It should be noted that if the source gas stream is hot, as from a flue stack, it may be necessary to allow the gas to cool prior to admission to the system of the invention. Inlet of the gas stream is regulated by a solenoid gas valve 14, and moisture is removed by a filter 16. The flow rate of the incoming stream is monitored by a flowmeter 17, and the carbon dioxide content of the incoming gas stream is monitored by a first infra-red gas monitoring device 18; the signals from flowmeter 17 and monitor 18 as well from further instrumentation (discussed below) may be displayed on a computer screen 24, and used to control the process, as detailed below.

The incoming gas stream then enters an absorbtion vessel 26, which may comprise a sealed tube made of suitable material such as stainless or carbon steel, or PVC pipe. Within vessel 26 is disposed a quantity of a material 28 that preferentially absorbs carbon dioxide. This absorbent material 28 can be selected from a number of possible absorbent materials, such as perfluorocarbons; one such suitable perfluorocarbon is perfluorodecalin. The absorbent can be provided as an aqueous solution. However, the invention is not to be limited to this material; various materials, including water alone, exhibit useful preferential absorbtivity for carbon dioxide. The absorbent material 28 may be mixed with or disposed on solid members having high surface area, such as small ceramic tubes or the like, to ensure good mixing and efficient absorbtion of the carbon dioxide.

The inlet of vessel 26 may be connected to an internal conduit 30, connected to a diffuser 32 near the bottom of vessel 26, whereby the incoming gas stream is efficiently distributed throughout the absorbent material 28. Thus, as the incoming gas stream enters vessel 26, the carbon dioxide is preferentially absorbed on the absorbent material 28, while the remainder of the gas stream passes out of vessel 26 at an exit port 34, provided with an exit valve 35. The remainder of the gas stream can be vented, or further processed if desired. The carbon dioxide content of the exiting stream is monitored by a further infrared monitoring device 20; while carbon dioxide is being absorbed on the absorbent material, the carbon dioxide content of the exiting gas stream will be very low or zero.

When the carbon dioxide content of the exiting stream suddenly increases, this is taken to be an indication that the absorbent is saturated with carbon dioxide. At this point the inlet valve 12 and exit valve 35 are closed, and a vacuum pump 40 energized. The reduced gas pressure in vessel 26 then causes the carbon dioxide to be desorbed from the absorbent material 28. The flow rate of the desorbed carbon dioxide is measured by a further flowmeter 42, and the carbon dioxide content of the exiting stream, indicated at 44, is monitored for purity by a further infrared analyzer 22. Again, this data can be stored and displayed by computer 24, to provide a complete record of the process. Computer 24 can also be programmed and provided with appropriate control connections to operate the valves, vacuum pump 40, and other components, so as to fully automate the process according to the invention.

The carbon dioxide exiting vessel 26 can be collected and used for any of a wide variety of purposes, such as a feedstock for agriculture (algae, land crops), and various commercial gas purposes.

Figure 2:
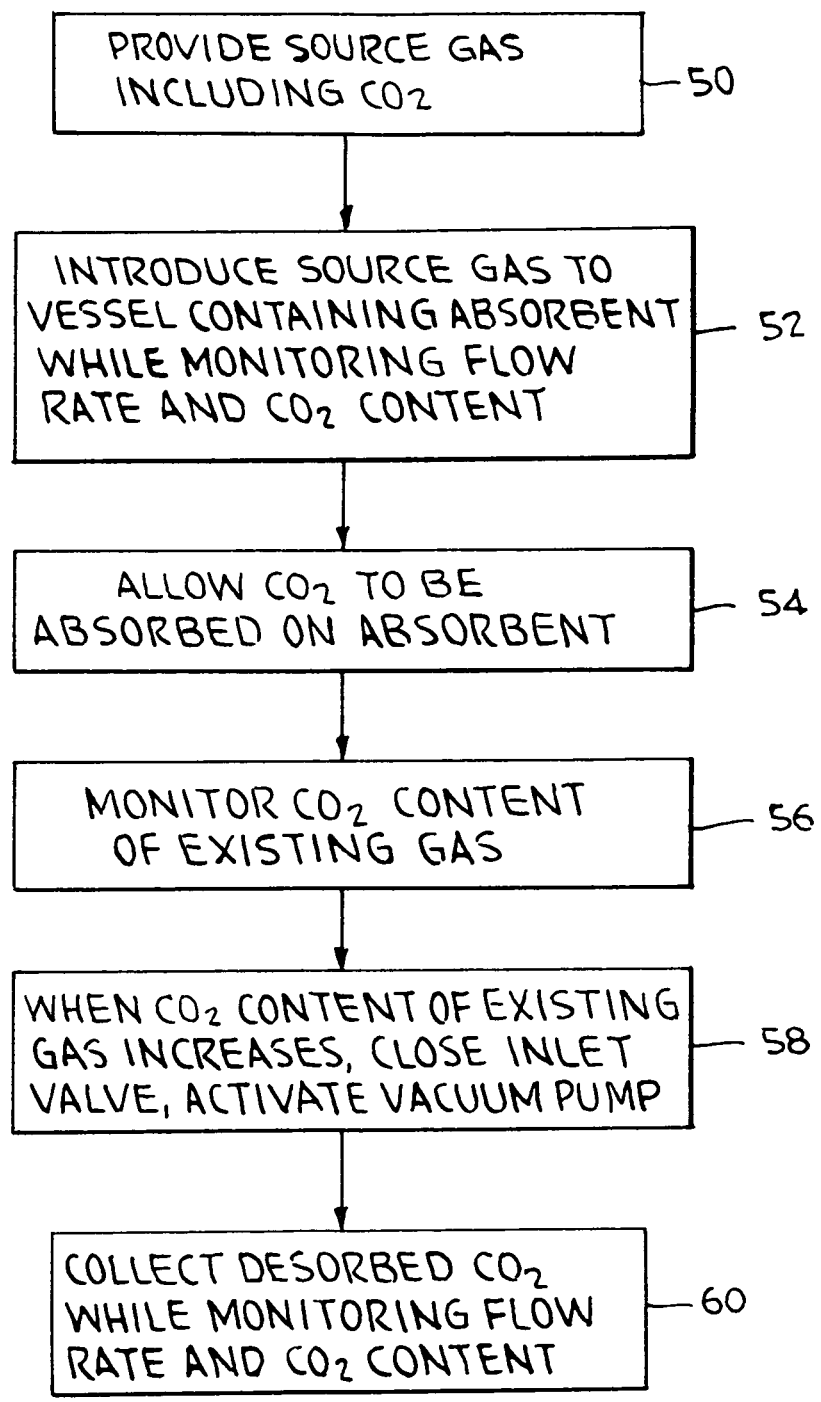
FIG. 2 is a flow chart illustrating the principal steps in the method of practice of the invention.

FIG. 2 provides a flowchart illustrating the principal steps in the method of the invention, performed using the apparatus of FIG. 1.

In step 50, a source gas stream including carbon dioxide is provided. At step 52, the source gas stream is admitted into a vessel containing a material preferentially absorbing carbon dioxide while not absorbing the other components of the incoming gas stream, while analyzing the source gas to determine the concentration of carbon dioxide, and measuring its flow rate. At step 54, the carbon dioxide is allowed to be absorbed on the absorbent material, while at step 56, the carbon dioxide content of the exiting gas stream (that is, the incoming gas stream, having had the carbon dioxide removed therefrom) is monitored. During the process, the absorbent eventually become saturated with carbon dioxide. Accordingly, when at step 58 a sudden increase in the carbon dioxide content of the exit stream is detected, the inlet and exit valves are closed, and the vacuum pump energized. This causes the carbon dioxide to be desorbed, such that it is collected at step 60.

It should be appreciated that the above system of FIG. 1 may be in unitary configuration as outlined above, can be multiplied to provide any desired processing capability, or, alternatively may be subdivided into one or more component parts. For example, the absorbent may be saturated with carbon dioxide at a facility near the flue stack but then the carbon dioxide gas may be released from the absorbent at another facility or plant to use for a different purpose. Alternatively, the saturated absorbent may be transported to an offsite location, such as a storage injection site for storage miles underground, for storage or to a temporary holding area for purposes of possible release of the carbon dioxide gas at a later time in the commercial gas industry. Also, the saturated absorbent may be transported by pipeline, truck, or other means for usage or storage offsite.

The carbon dioxide gas obtained by the system and method disclosed above can be isolated and stored, used, or disposed of, e.g., by sequestration. The carbon dioxide gas may be used in a multitude of industries including, without limitation, the food industry, oil industry, chemical industry, storage injection sites, and commercial gas industry.

Additional aspects, features and advantages afforded by the present invention will be apparent from the detailed description and figures.

It will be appreciated by those skilled in the art that various changes and modifications can be made to the illustrated embodiments without departing from the spirit of the present invention. All such modifications and changes are intended to be within the scope of the present invention.

What is claimed is:

1. A method for capturing carbon dioxide from a source gas stream, comprising the steps of:
    (a) providing a source gas stream including carbon dioxide;
    (b) admitting the source gas stream to a vessel containing a quantity of a perfluorocarbon absorbent preferentially absorbing carbon dioxide without necessity of a chemical reaction between the absorbent and carbon dioxide;
    (c) allowing the absorbent to become saturated with carbon dioxide from the source gas stream, while allowing the remainder of the source gas stream to escape from the vessel;
    (d) monitoring the carbon dioxide content of the escaping gas stream;
    (e) when the monitored carbon dioxide content of the escaping gas stream indicates that carbon dioxide is present in the escaping gas stream, ceasing admission of the source gas stream into the vessel;
    (f) causing the carbon dioxide to be desorbed from the saturated absorbent by providing negative pressure using a vacuum pump without necessity of a chemical reaction between the absorbent and carbon dioxide; and
    (g) collecting the desorbed carbon dioxide.

2. The method of claim 1, comprising the further step of analyzing the source gas stream to determine the concentration of carbon dioxide therein.

3. The method of claim 1, comprising the further step of measuring the flow rate and concentration of the desorbed carbon dioxide.

4. The method of claim 1, wherein the absorbent is perfluorodecalin.

* * * * *